(12) United States Patent  
Carter et al.

(10) Patent No.: US 8,589,665 B2  
(45) Date of Patent: Nov. 19, 2013

(54) INSTRUCTION SET ARCHITECTURE EXTENSIONS FOR PERFORMING POWER VERSUS PERFORMANCE TRADEOFFS

(75) Inventors: John B. Carter, Austin, TX (US); Jian Li, Austin, TX (US); Karthick Rajamani, Austin, TX (US); William E. Speight, Austin, TX (US); Lixin Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 757 days.

(21) Appl. No.: 12/788,940

(22) Filed: May 27, 2010

(65) Prior Publication Data

US 2011/0296149 A1   Dec. 1, 2011

(51) Int. Cl.  
*G06F 9/00* (2006.01)

(52) U.S. Cl.  
USPC ......................................................... 712/229

(58) Field of Classification Search  
USPC ......................................................... 712/229  
See application file for complete search history.

(56) References Cited

U.S. PATENT DOCUMENTS

| | | | |
|---|---|---|---|
| 6,775,787 B2 * | 8/2004 | Greene | 713/340 |
| 7,174,469 B2 | 2/2007 | Luick | |
| 7,185,215 B2 | 2/2007 | Cook et al. | |
| 7,461,235 B2 | 12/2008 | Yang et al. | |
| 8,250,298 B2 | 8/2012 | Elnozahy et al. | |
| 2006/0291812 A1 * | 12/2006 | Takezaki | 386/95 |
| 2009/0282220 A1 | 11/2009 | Norden | |
| 2009/0328055 A1 | 12/2009 | Bose et al. | |
| 2010/0017638 A1 | 1/2010 | Ghose | |

OTHER PUBLICATIONS

Marculescu, Diana et al., "Adaptive Program Executing for Low Power in Superscalar processors", Department of Electrical and Computer Engineering, University of Maryland, Oct. 1999, 13 pages.
Surendra, G. et al., "Exploiting the Behavior of Ready Instructions for Power Benefits in a Dynamically Scheduled Embedded Processor", http://www.serc.iisc.ernet.in/cadl/people/surendra/mwscas.pdf, IEEE, Circuits and Systems, 2004, MWSCAS (2004 47th Midwest Symposium on Circuits & Systems), vol. 2, pp. II-441-II-444.
Surendra, G. et al., "Power-Performance Trade-off Using Pipeline Delays", Proceedings of the 2004 Asia and South Pacific Design Automation Conference, http://portal.acm.org/citation.cfm?id=1015186, pp. 384-386.
Jimenez, Daniel A. et al., "Boolean Formula-based Branch Prediction for Future Technologies", Proceedings of the 2001 International Conference on Parallel Architectures and Compilation Technologies, 2001, http://cava.cs.utsa.edu/pdfs/pact01.pdf, 10 pages.
Valluri, Madhavi et al., "Exploiting Compiler-Generated Schedules for Energy Savings in High-Performance Processors", ISLPED'03, Aug. 25-27, 2003, pp. 414-419.

* cited by examiner

*Primary Examiner* — Robert Fennema  
(74) *Attorney, Agent, or Firm* — Francis Lammes; Stephen J. Walder, Jr.; Eustus D. Nelson (57) ABSTRACT

Mechanisms are provided for processing an instruction in a processor of a data processing system. The mechanisms operate to receive, in a processor of the data processing system, an instruction, the instruction including power/performance tradeoff information associated with the instruction. The mechanisms further operate to determine power/performance tradeoff priorities or criteria, specifying whether power conservation or performance is prioritized with regard to execution of the instruction, based on the power/performance tradeoff information. Moreover, the mechanisms process the instruction in accordance with the power/performance tradeoff priorities or criteria identified based on the power/performance tradeoff information of the instruction.

16 Claims, 4 Drawing Sheets

INSTRUCTION SET ARCHITECTURE EXTENSIONS FOR PERFORMING POWER VERSUS PERFORMANCE TRADEOFFS

BACKGROUND

The present application relates generally to an improved data processing apparatus and method and more specifically to extensions to an instruction set architecture that allows power versus performance tradeoff decisions to be performed within a data processing system.

With modern computing systems, the instruction set architecture (ISA) is the part of a computer or data processing system architecture related to programming. This includes the native data types, instructions, registers, addressing modes, memory architecture, interrupt and exception handling, and external input/output. The ISA includes a specification of the set of opcodes in machine language, and the native commands implemented by a particular processor. Within known ISAs, the instructions of the ISA only specify an operation to be performed as well as the data on which to perform the operation.

Modern technology has focused primarily on techniques for making such instructions execute as fast as possible, i.e. providing the best possible performance of the processor architecture with regard to executing the instructions of the ISA. This is because historically, companies have required greater and greater throughputs and speed when executing applications. Recently, however, more focus has been placed on power or energy consumption over performance considerations. Unfortunately, modern computing architectures, developed in view of the historical trend mentioned above, are not configured with power or energy conservation as a key goal. Furthermore, there is no ability in known architectures for making tradeoffs between power or energy conservation and providing desired performance, let alone doing so at the instruction level.

SUMMARY

In one illustrative embodiment, a method, in a data processing system, is provided for processing an instruction in a processor of the data processing system. The method comprises receiving, in a processor of the data processing system, an instruction, the instruction including power/performance tradeoff information associated with the instruction. The method further comprises determining, by the processor, power/performance tradeoff priorities or criteria, specifying whether power conservation or performance is prioritized with regard to execution of the instruction, based on the power/performance tradeoff information. Moreover, the method comprises processing, by the processor, the instruction in accordance with the power/performance tradeoff priorities or criteria identified based on the power/performance tradeoff information of the instruction.

In another illustrative embodiment, a system/apparatus is provided. The system/apparatus may comprise one or more processors having a plurality of hardware units and a power/performance tradeoff unit. The power/performance tradeoff unit may operate to cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for extending an instruction set architecture (ISA) by associating additional power/performance tradeoff information with instructions in the ISA to identify whether those instructions should be executed with power consumption reduction as a priority or with best performance as a priority. The illustrative embodiments make use of the observation that hardware in a data processing system is often not uniform and, as a result, there are faster paths and slower paths through the hardware, e.g., different functional units that operate at different speeds, different cores that operate with different frequencies, etc. In addition, there are different ways to execute an instruction, such as through emulation or through a dedicated functional unit, for example. The additional power/performance tradeoff information provides a hint to the hardware mechanisms as to how to process the corresponding instruction using these varying characteristics of the hardware so as to perform a tradeoff between power conservation and performance.

The additional power/performance tradeoff information provided by the extended ISA of the illustrative embodiments is passed with the instruction through the processor pipeline and is used by one or more power/performance tradeoff logic units within the processor architecture to make decisions as to how the instruction is to be processed within the processor architecture. Essentially, at various places within the processor architecture where there is more than one possible path, i.e. sequence of functional units used to process the instruction, or more than one possible manner by which the instruction may be processed, a power/performance tradeoff logic unit may be used to determine which path the instruction will take based on the power/performance tradeoff information included with the instruction. This may be one place within the processor architecture or a plurality of places within the processor architecture.

The power/performance tradeoff logic units may make different decisions based on the types, or combinations of types, of power/performance tradeoff information included in the instructions. For example, the inclusion of power/performance tradeoff information in the instructions may comprise including bits for specifying one or more of a criticality of the instruction (i.e. whether the instruction is part of a critical path in the code); a frequency of use of the instruction; read/write characteristics of the instruction specifying whether the data is going to be read only, written only, or modified; an energy priority value; and/or the like. Based on this power/performance tradeoff information, the power/performance tradeoff logic units may perform decisions to process the instruction in various ways to either emphasize performance over power consumption or emphasize power consumption conservation over performance. For example, the power/performance tradeoff information may be used to: (1) determine to provide an instruction with higher/lower issue queue priority; (2) route the instruction to faster/slower hardware paths; (3) route the instruction to a dedicated execution unit if it exists; (4) use emulation of a dedicated unit rather than routing the instruction to the dedicated execution unit and turning off the dedicated execution unit to conserve power; (5) turn off emulation, cracking or microcoding; (6) not performing power gating of corresponding functional units that will process the instruction; (7) run corresponding functional units at lower speed or apply aggressive power gating on them; (8) emulate the functional units without turning on the corresponding functional units; (9) perform aggressive speculative execution; (10) not perform speculative execution; (11) utilize alternate "fast pathways" for quick retrieval of data from main memory; (12) perform computation with a different precision requirement that has a different power-performance tradeoff; and/or the like. Based on these decisions, the instruction may be routed through various paths within the processor architecture and/or various control signals may be issued to change the operation of functional units within the processor architecture so as to achieve an operation that emphasized one of power or performance over the other with regard to the processing of the instruction. It should be appreciated that these are only examples of the various decisions that may be made by power/performance tradeoff logic based on power/performance tradeoff information included with the instructions and other decisions and corresponding operations to conserve power over performance or provide performance over power may be made without departing from the spirit and scope of the illustrative embodiments.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
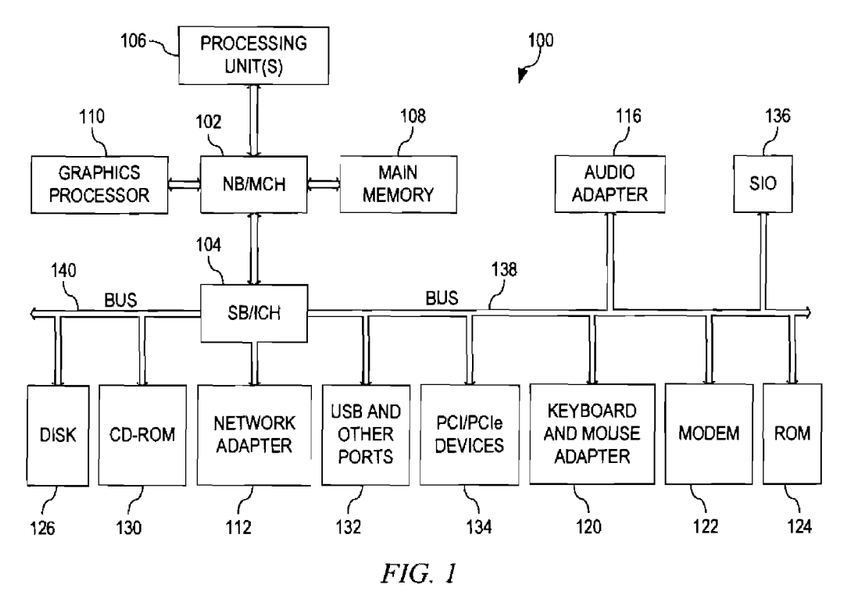
FIG. 1 is an example diagram of a data processing system in which example aspects of the illustrative embodiments may be implemented.

The illustrative embodiments may be utilized in many different types of data processing environments including a distributed data processing environment, a single data processing device, or the like. FIG. 1 is a block diagram of an example data processing system in which aspects of the illustrative embodiments may be implemented. Data processing system 100 is an example of a computer, such as client or server computer, in which computer usable code or instructions and hardware implementing the processes and mechanisms of illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device that is configured with flash memory to provide non-volatile memory for storing operating system files and/or user-generated data, for example. Essentially, data processing system 100 may be any known or later developed data processing system without architectural limitation.

Figure 2:
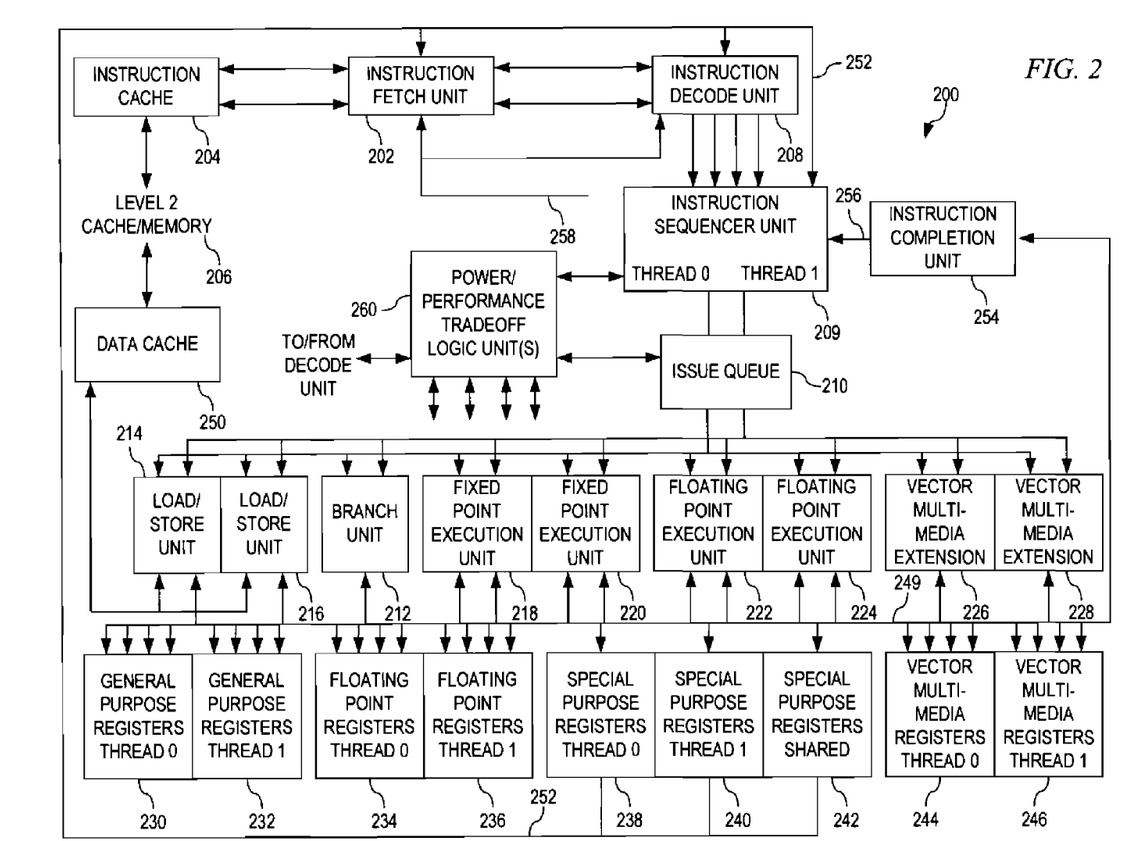
FIG. 2 is an example block diagram of a processor in which example aspects of the illustrative embodiments may be implemented.

Referring to FIG. 2, an exemplary block diagram of a dual threaded processor design showing functional units and registers is depicted in accordance with an illustrative embodiment. Processor 200 may be implemented as one or more of the processing units 106 in FIG. 1, for example. Processor 200 comprises a single integrated circuit superscalar microprocessor with dual-thread simultaneous multi-threading (SMT) that may also be operated in a single threaded mode.

Accordingly, as discussed further herein below, processor 200 includes various units, registers, buffers, memories, and other sections, all of which are formed by integrated circuitry.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) that accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

Notably, in accordance with the mechanisms of the illustrative embodiments, one or more power/performance tradeoff logic units 260 are provided in the processor architecture 200. While these power/performance tradeoff logic units 260 are shown as being separate logic from that of the other units in the processor architecture 200, it should be appreciated that this logic may be integrated with one or more of the other units of the processor architecture 200 without departing from the spirit and scope of the illustrative embodiments. For example, a power/performance tradeoff logic unit 260 may be integrated into the issue queue 210, one or more of the load/store units 214, 216, one or more of the execution units 218-224, one or more of the vector multimedia extension units 226-228, or the like. Therefore, the control mechanism and its implementation, for example, the control paths between a power/performance tradeoff logic unit 260 and other on-chip units, may vary without departing from the spirit and scope of the illustrative embodiments. For purposes of the following description, however, it will be assumed that the power/performance tradeoff logic unit(s) 260 are separate logic units having data/control signal paths or wirings to/from one or more of the other units in the processor architecture 200. For simplicity of the drawing, the separate data/control signal paths or wires to each of the units in the processor architecture 200 are represented as double headed arrows that are not explicitly connected to these units but, in an actual implementation, they would be connected to, and provide communication pathways between, one or more of the other units in the processor architecture 200. The particular units to which the power/performance tradeoff logic unit(s) 260 are connected for communication purposes will depend upon the particular implementation and goals for the processor architecture 200.

With an example architecture such as shown in FIG. 2, the illustrative embodiments provide an extension of the instruction set architecture (ISA) such that instructions have one or more additional bits provided in the instruction for specifying power/performance tradeoff information. The types of power/performance tradeoff information that may be included in these one or more additional bits depends upon the particular implementation chosen but may include such information as the criticality of the instruction, the frequency of the instruction in the code, information about what will happen following the execution of the instruction, e.g., a read only instruction, write only instruction, or a read-modify-write instruction, and/or whether to prioritize performance over energy conservation or energy conservation over performance. These bits may be set by a compiler or runtime feedback engine, for example, upon analyzing the code and/or obtaining measurements of the performance of the processor architecture during the execution of the code in the runtime environment, so as to achieve an optimum power-performance to thereby give a optimal, or at least desired, performance per watt of power for the processor architecture.

With the mechanisms of the illustrative embodiments, when an instruction is fetched by the instruction fetch unit 202, the instruction has the additional power/performance tradeoff information associated with the instruction, such as in bits that are provided as part of the instruction. The instruction and the additional power/performance tradeoff information, or simply the additional power/performance tradeoff information, may further be provided to power/performance tradeoff logic unit(s) 260 either from the instruction fetch unit 202, instruction decode unit 208, instruction sequencer unit 209, issue queue 210, or the like. In one illustrative embodiment, the power/performance tradeoff logic unit(s) 260 receives at least the additional power/performance tradeoff information for the instruction from the instruction decode unit 208.

The power/performance tradeoff logic unit 260 (referring to only one power/performance tradeoff logic unit 260 but with the understanding that this description can be extended to multiple power/performance tradeoff logic units) either itself stores processor architecture characteristic information or has access to such information which describes the performance/power capabilities of the various units in the processor architecture 200. For example, this processor architecture characteristic information may include operating frequencies of functional units, designation of faster/slower paths through the hardware units of the architecture, approximate energy values for operations, maximum allowable power expenditures in various portions of the architecture, and the like. In this way, the power/performance tradeoff logic unit 260 is provided with information about the power/performance capabilities of the various paths through the hardware units of the processor architecture 200 so that when faced with a decision between paths for the execution of an instruction, the power/performance tradeoff logic unit 260 can select a path that corresponds to the power/performance tradeoff information included in the instruction.

The power/performance tradeoff logic unit 260, in response to receiving the additional power/performance tradeoff information for an instruction, analyzes the additional power/performance tradeoff information and determines what tradeoff to make between performance and power consumption based on the additional power/performance tradeoff information, e.g., what the power/performance tradeoff priorities or criteria are for the particular instruction. For example, if a bit in the additional power/performance tradeoff information is set to indicate that the instruction is part of a critical path in the code, i.e. a longest execution path or a path that requires the most processor cycles to complete, then the instruction may be routed to a high performance path which may also be a high power consumption path in the processor architecture. That is, if floating point execution unit 222 operates at a higher frequency than floating point execution unit 224, then an execution path that includes floating point execution unit 222 may be selected for processing the instruction. Functional units that are not part of the selected execution path may be temporarily powered down or put into a low power state in order to reduce power consumption while the instruction is being executed and may be powered back up in the event they are selected to process a subsequent instruction.

In general, for instructions that have one or more bits set indicating that the instruction is part of a critical path in the code, the power/performance tradeoff logic unit 260 may provide the corresponding instruction a higher issue priority in the issue queue 210, such as by placing it at a top of the queue so that it is executed next, for example, may route the instruction to faster paths within the hardware of the processor architecture 200, or may route the instruction to a dedicated unit for executing the type of instruction if one exists, e.g., a div unit or the like. Conversely, for instructions that have one or more bits set indicating that the instruction is not part of a critical path in the code, the power/performance tradeoff logic unit 260 may provide the corresponding instruction a lower issue priority in the issue queue 210, such as by placing it at a bottom of the queue, for example, may route the instruction to slower paths within the hardware of the processor architecture 200, or may use emulation of a dedicated unit and turn off any actual dedicated unit for performing the type of instruction. As a result, critical instructions are sent to higher power consumption but also higher performance paths while non-critical instructions are sent to lower power consumption and lower performance paths.

The power/performance tradeoff logic unit 260 may make similar determinations with regard to other types of power/performance tradeoff information included in the instruction. For example, the additional power/performance tradeoff information included with the instruction may include one or more bits indicating if the instruction is used frequently in the code or not. In general, for instructions that have one or more bits set indicating that the instruction is used frequently, the power/performance tradeoff logic unit 260 may instruct the units within the processor architecture to execute the instruction without emulation, cracking, or microcoding. Cracking refers to the breaking of a complex instruction into two pieces that are executed on dedicated logic, whereas microcoding may break an instruction into many smaller operations that are looked up in an on-chip storage device such as a ROM. Both techniques lead to larger numbers of instructions being executed and thus poorer energy characteristics. Moreover, the power/performance tradeoff logic unit 260 may instruct the units of the processor architecture 200 to execute the instruction without power gating of the corresponding functional units.

For instructions that do not have these one or more bits set, indicating that the instruction is not used frequently, the power/performance tradeoff logic unit 260 may instruct the units of the processor architecture 200 to run corresponding functional units at a lower speed or with aggressive power gating applied. Moreover, the power/performance tradeoff logic unit 260 may cause emulation to be used without turning on the corresponding functional units.

As another example, the power/performance tradeoff logic unit 260 may make similar determinations with regard to power/performance tradeoff information included in the instruction indicating a preference for power conservation over performance or vice versa. For example, the additional power/performance tradeoff information included with the instruction may include one or more bits indicating if the instruction is to be executed with performance to be prioritized of power conservation. If these one or more bits are set, then performance is prioritized over power conservation and if they are not set, then power conservation will be prioritized over performance. In general, for instructions that have these one or more bits set, the power/performance tradeoff logic unit 260 may select a high power consumption but high performance path in the hardware of the processor architecture and memory subsystem, instruct the units within the processor architecture to execute the instruction as fast as possible (e.g., using a highest frequency setting or the like), perform aggressive speculative execution of the instruction, and the like. For instructions that do not have these one or more bits set, the power/performance tradeoff logic unit 260 may select a lower power consumption, and lower performance, path in hardware of the processor architecture, instruct the units within the processor architecture to execute the instruction in a power efficient manner with no speculative execution, or the like.

In yet another example, the power/performance tradeoff logic unit 260 may make similar determinations with regard to power/performance tradeoff information including in the instruction indicating what is likely to occur after execution of the instruction. For example, this information may identify whether the instruction is simply a read only instruction, a write only instruction, or a read with intent to modify instruction. For read only instructions, what is meant is that the data will be read by the instruction but that the data may not be used for a relatively large amount of time. Similarly, the write only instruction means an instruction in which data will be written but again may not be used for a relatively large amount of time. For read with intent to modify instructions, the opposite is true in that the data is going to be read and is likely to be modified within a short amount of time of the reading of the data.

Based on this additional power/performance tradeoff information, the power/performance tradeoff logic unit 260 may determine for those instructions whose results are not going to be used for some time, that these instructions be provided to lower power and lower performance paths and otherwise utilize hardware that has lower performance and lower power consumption. For those instructions whose results are going to be used relatively quickly following the execution of the current instruction, the power/performance tradeoff logic unit 260 may direct those instructions to higher power and higher performance paths.

Other types of power/performance tradeoff information may be used and may be the basis for other similar types of decisions by the power/performance tradeoff logic unit 260 for determining whether to favor power conservation over performance or vice versa for execution of individual instructions, or groups of instructions associated with these instructions, in a processor architecture having paths with different processing capabilities. The power/performance tradeoff logic units 260 may send control signals to various ones of the units of the processor architecture 200 based on the results of these decisions to cause the units to operate in accordance with the decision rendered by the power/performance tradeoff logic units 260 for the execution of the instruction, or group of instructions associated with this instruction. The various units of the processor architecture 200 may comprise additional logic where necessary to modify the units' operation in accordance with these control signals. For example, units may be placed in a low power state when not needed for execution of the instruction, or group of instructions associated with this instruction. Units may have logic for adjusting frequencies based on whether performance or power conservation is a priority for the execution of an instruction, or group of instructions associated with this instruction. Other logic for making adjustments to the operation of the units in the processor architecture 200 based on control signals from the power/performance tradeoff logic units 260 may also be provided.

Furthermore, the power/performance tradeoff unit(s) 260 may issue such information to the memory subsystem to conserve power or increase performance. An example of this is a direction by the power/performance tradeoff unit 260 that data should be fetched from main memory using a provided higher-power but faster pathway than the normal bus 102 shown in FIG. 1. Such fastpaths are provided in architectures such as the POWER7 processor from IBM but no intelligence is included as to which instructions should make use of them as is proposed herein.

Figure 3:
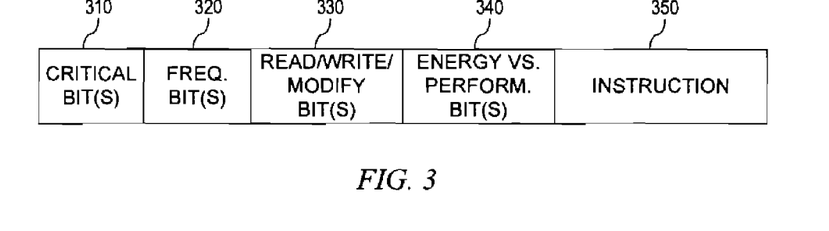
FIG. 3 is an example diagram of an instruction in accordance with one illustrative embodiment.

FIG. 3 is an example diagram of an instruction with additional power/performance information included therein in accordance with one illustrative embodiment. As shown in FIG. 3, in one illustrative embodiment, the instruction 350 has additional power/performance tradeoff information 310-340 associated with it that may be set or added by a compiler and/or runtime performance monitoring engine to specify the manner by which the instruction 350 is to be executed with regard to power conservation and performance tradeoffs. In the depicted example, four types of additional power/performance tradeoff information 310-340 are shown. A first type of additional power/performance tradeoff information 310 comprises critical bit(s) 310 which specify whether the instruction 350 is part of a critical path in the code or not. These bits 310 may be set by a compiler or runtime performance monitoring system, or a compiler based on information from a runtime performance monitoring system, in response to analysis being performed that identifies the instruction 350 as being part of a critical path, i.e. the instruction lies along a pathway of instruction flow that gates the overall performance of the application.

A second type of additional power/performance tradeoff information 320 comprises one or more frequently used bits 320 that identifies whether the instruction 350 is frequently used within the code. These bits may be set by a compiler and/or runtime performance monitoring system in response to analysis determining that, for example, the number of occurrences of the instruction 350 in the code exceeds a predetermined threshold. The architecture may use such information to ensure that these instructions are kept in the instruction cache 204 in FIG. 2, for instance, by altering the cache replacement logic dynamically.

A third type of additional power/performance tradeoff information 330 comprises one or more read/write/modify bits 330 that identify whether the instruction 350 is a read only, write only, or read with intent to modify instruction. These bits may be set by the compiler and/or runtime performance monitoring system in response to analysis determining that, for example, the results of the instruction 350 may be used relatively recently or not, i.e. within a predetermined number of instructions, cycles, or the like. These bits may be used, for example, in conjunction with a smart memory controller to institute power savings in the handling of DRAM state machines, such as that described in co-pending U.S. patent application Ser. No. 12/789,019, for example. Some storage media, such as phase-change memory (PCM) or some other non-volatile memory, uses significant more power doing a write than doing a read. On the contrary, some storage media, such as SRAM, uses the same amount of power for doing a read as it uses for doing a write. Another example use of these bits is to determine in which storage media the corresponding data should be stored, i.e., read only data may be stored in a PCM unit or the like that has excellent power-performance characteristics for reads and read-write data may be stored in a SRAM unit or the like that has excellent power-performance characteristics for writes.

A fourth type of additional power/performance tradeoff information 340 comprises one or more energy vs. performance bits 340 for specifying for the instruction 350 whether or not energy (power) conservation is a priority or performance is a priority. Again, these bits may be set based on compiler and/or runtime performance monitoring analysis of the code. The compiler and/or runtime performance monitoring system may set these bits based on various types of analysis including identifying portions of code, i.e. instructions, that can be executed using lower power consumption and lower performance paths with other portions of code being executed using higher power consumption but higher performance paths. An example usage would be deciding whether dedicated functional units should be used for expensive operations (such as floating point divides and the like) or emulation to save power costs.

While FIG. 3 shows all four types of additional power/performance tradeoff information 310-340 being associated with the instruction 350, this is not required. To the contrary, any number of types of power/performance tradeoff information may be used without departing from the spirit and scope of the illustrative embodiments. Moreover, other types of additional power/performance tradeoff information may be used in addition to, or in replacement of, one or more of the types shown in FIG. 3.

Figure 4:
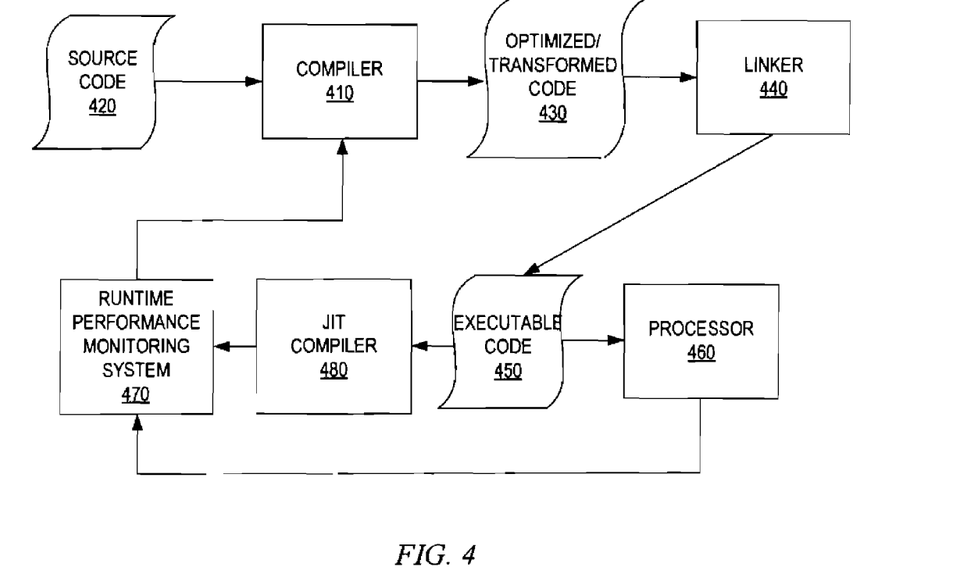
FIG. 4 is an example diagram of a system for setting power/performance tradeoff information in accordance with one illustrative embodiment.

FIG. 4 is an example diagram of a system for setting power/performance tradeoff information in accordance with one illustrative embodiment. As shown in FIG. 4, the compiler 410 receives original source code 420, which is analyzed in accordance with the illustrative embodiments for which the compiler 410 is configured. That is, the compiler 410 identifies instructions in the source code 420 that can be executed more efficiently using tradeoffs between power conservation and performance based on analysis of the code 420 and optionally based on the analysis performed by a runtime performance monitoring engine 470 during the execution of a previously compiled version of the code 420. The compiler 410 may then set bits in the additional power/performance tradeoff information of the instructions which may be used by power/performance tradeoff logic units to determine how to handle the execution of the instructions in the processor architecture.

The result of the compiler analysis and modification of the instructions in the code is optimized/transformed code 430 that instructions with the additional power/performance tradeoff information set according to the analysis performed by the compiler in accordance with the illustrative embodiments. The optimized/transformed code 430 is then provided to linker 440 that performs linker operations, as are generally known in the art, to thereby generate executable code 450. The executable code 450 may then be executed by the processor 460, with the execution of the code 450 being monitored by the runtime performance monitoring engine 470.

This process may be repeated as necessary, with the code 450 being the source code 420 for the next iteration, until a desired execution of the code 450 is achieved.

It should be noted that the above example embodiment illustrates the cooperative interaction of the compiler 410 with the runtime performance monitoring engine 470 to determine how to modify the instructions in the code 420. However, it should be appreciated that the compiler 410 may make such determinations without the aid of a runtime performance monitoring engine 470 and instead may make the decisions based on a static analysis of the code 420. Alternatively, the runtime performance monitoring engine 470 may make the determinations itself using dynamic analysis of the code 450 and may itself set the bits in the additional power/performance tradeoff information of the instructions with the compiler 410 serving a more passive roll, if any.

Similarly, it should be appreciated that a JIT ("just in time") compiler 480, such as is used in the Java© programming language, could be used during the execution of the application to guide power and performance tradeoffs with input from the runtime performance monitoring system 470 as shown in FIG. 4. In this case, the compiler that produces static code, 410, is not used and the transformation happens online.

Figure 5:
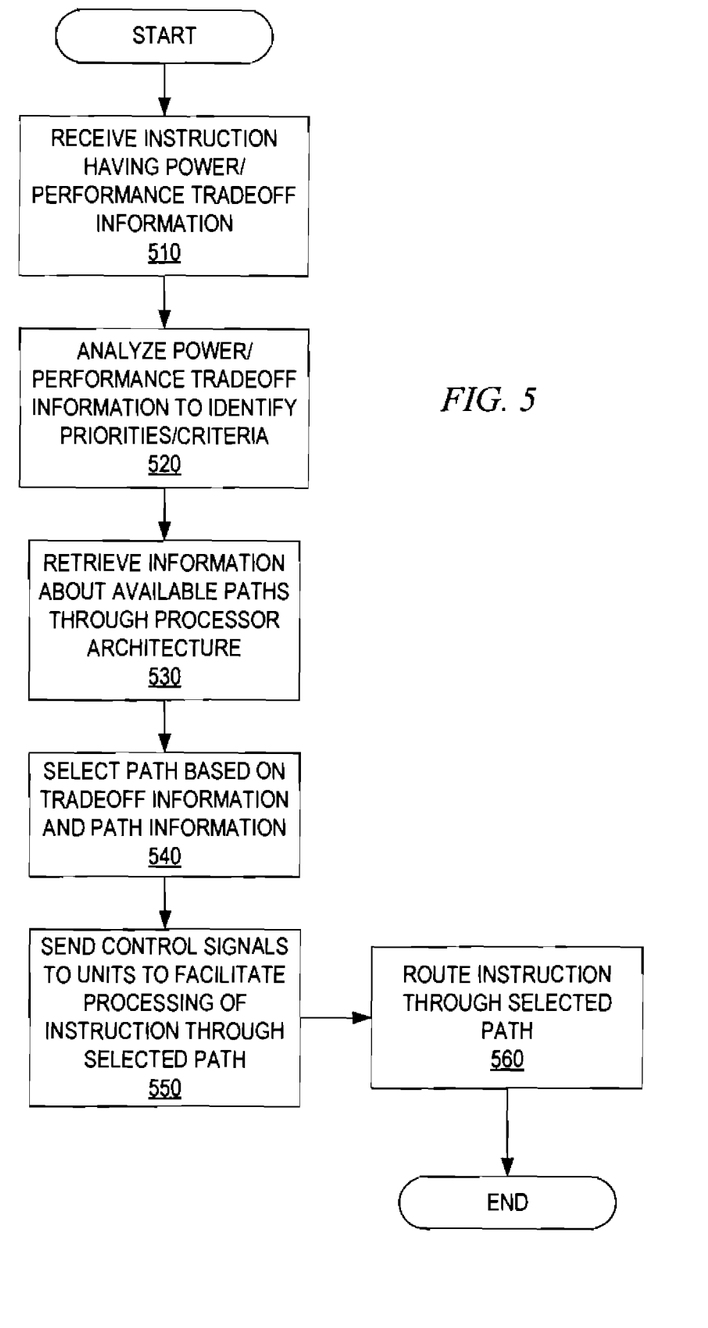
FIG. 5 is a flowchart outlining an example operation of power/performance tradeoff logic in accordance with one illustrative embodiment.

FIG. 5 is a flowchart outlining an example operation of power/performance tradeoff logic in accordance with one illustrative embodiment. The operation starts with the receipt of an instruction having additional power/performance tradeoff information associated with it in accordance with one or more of the illustrative embodiments described herein (step 510) from either the static compiler 410 in FIG. 4 or the JIT 480 in FIG. 4. The additional power/performance tradeoff information is analyzed to identify the priorities and tradeoff criteria associated with the instruction (step 520). Information about the various available paths and options for processing the instruction through the processor architecture is accessed (step 530). Based on the power/performance tradeoff information associated with the instruction and the priorities and tradeoff criteria specified by this information, as well as the information about the various paths and options for processing, the power/performance tradeoff logic selects a path through the processor architecture for the instruction to follow (step 540). The selected path may be one that meets the power/performance priorities and criteria specified by the power/performance tradeoff information associated with the instruction. For example, if the power/performance tradeoff information indicates that power conservation is to be prioritized over performance with regard to this particular instruction, or a group of instructions associated with this instruction, then a low power, low performance path may be selected for the instruction's processing.

It should be appreciated that, in one illustrative embodiment, the selection of a path may involve just selecting a next unit along the path to which to send the instruction with this determination being made again at each step along the path. Alternatively, an entire path from the current unit to a final stage of processing of the instruction may be selected.

Having selected a path for the instruction to take through the processor architecture, control signals are sent to one or more units in the processor architecture to facilitate the flow of the instruction through the selected path and to minimize power consumption of other unused units (step 550). The instruction is then routed through the path (step 560) and the operation terminates.

As an example, the control signals may turn on/off particular units in the processor architecture based on whether or not the units are to be used to process the instruction. Those units that are not needed to process the instruction, and which can be set to a lower power state, may be turned off or placed in an idle state so that they consume less power while the instruction is being executed. These units may be turned back on or placed in a high power state when they are needed by a subsequent instruction for the execution of that subsequent instruction, or group of instructions associated with the subsequent instruction.

Thus, the illustrative embodiments provide mechanisms for placing information in the instructions, or otherwise associated with the instructions, of an instruction set architecture to identify desired power/performance tradeoff criteria and priorities with regard to the execution of that particular instruction, or group of instructions associated with the instruction. Furthermore, the illustrative embodiments provide mechanisms for interpreting this additional power/performance tradeoff information of the instructions so as to select a desirable path through the processor architecture that provides, as much as possible, the desired tradeoff between power and performance. In this way, power consumption may be minimized while achieving desired performance for those instructions for which performance is paramount.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for processing an instruction in a processor of the data processing system, comprising;

receiving, in the processor of the data processing system, an instruction, the instruction including power/performance tradeoff information associated with the instruction, wherein the power/performance tradeoff information comprises one or more bits for specifying one or more types of power/performance tradeoff criteria, and wherein the one or more bits are set and associated with the instruction by a compiler prior to execution of the instruction based upon one or more of statically analyzing code in which the instruction is present and obtaining measurements of performance of the processor during execution of a previously compiled version of the code in a runtime environment;

determining, by the processor, power/performance tradeoff priorities or criteria, specifying whether power conservation or performance is prioritized with regard to execution of the instruction, based on the power/performance tradeoff information; and processing, by the processor, the instruction in accordance with the power/performance tradeoff priorities or criteria identified based on the power/performance tradeoff information of the instruction, wherein processing the instruction in accordance with the power/performance tradeoff priorities or criteria comprises:

retrieving processor architecture characteristic information which describes performance/power capabilities of hardware units in the processor architecture; and selecting one or more hardware units in the processor architecture to process the instruction based on a comparison of the power/performance tradeoff priorities or criteria with the performance/power capabilities of the hardware units in the processor architecture.

2. The method of claim 1, wherein the power/performance tradeoff information comprises bits for specifying one or more of a criticality of the instruction identifying whether the instruction is part of a critical path in code being executed, a frequency of use of the instruction, read/write characteristics of the instruction specifying whether the data is going to he read only written only, or modified, or an energy priority value.

3. The method of claim 1, wherein processing the instruction in accordance with the power/performance tradeoff priorities or criteria comprises at least one of
giving the instruction a higher issue queue priority in response to performance being prioritized over power;
giving the instruction a lower issue queue priority in response to power being prioritized over performance;
routing the instruction to a faster hardware path in response to performance being prioritized over power; or
routing the instruction to a slower hardware path in response to power being prioritized over performance.

4. The method of claim 1, wherein processing the instruction in accordance with the power/performance tradeoff priorities or criteria comprises at least one of
routing the instruction to a dedicated execution unit in response to performance being prioritized over power;
using emulation of a dedicated unit rather than routing the instruction to the dedicated unit and turning off the dedicated unit to conserve power in response to power being prioritized over performance; or
turning off emulation, cracking or microcoding in response to power being prioritized over performance.

5. The method of claim 1, wherein processing the instruction in accordance with the power/performance tradeoff priorities or criteria comprises at least one of:
inhibiting performing power gating of corresponding functional units that will process the instruction in response to performance being prioritized over power;
running functional units at lower speed in response to power being prioritized over performance;
applying aggressive power gating on the functional units in response to power being prioritized over performance; or
emulating the functional units without turning on the corresponding functional units in response to power being prioritized over performance.

6. The method of claim 1, wherein processing the instruction in accordance with the power/performance tradeoff priorities or criteria comprises at least one of:
performing aggressive speculative execution in response to performance being prioritized over power;
inhibiting performing speculative execution in response to performance being prioritized over power;
utilizing alternate fast pathways for quick retrieval of data from main memory in response to performance being prioritized over power;
performing a computation with a precision requirement that has a lower power consumption in response to power being prioritized over performance; or
performing a computation with a precision requirement that has a higher power consumption but greater performance in response to performance being prioritized over power.

7. The method of claim 1, wherein processing the instruction in accordance with the power/performance tradeoff priorities or criteria comprises:
selecting a path through an architecture of the processor based on the power/performance tradeoff information; and
processing the instruction using the selected path.

8. The method of claim 7, wherein processing the instruction using the selected path comprises issuing, by the processor, control signals to units within the processor to cause the instruction to he processed using the selected path.

9. The method of claim 8, wherein the control signals cause a subset of units in the processor to go to a low power state, wherein the subset of units are units that are not part of the selected path.

10. The method of claim 1, wherein the processor architecture characteristic information includes at least one of operating frequencies of hardware units in the processor, designation of faster/slower paths through the hardware units of the processor architecture, approximate energy values for operations or hardware units, or maximum allowable power expenditures in hardware units of the architecture.

11. The method of claim 1, wherein the method is implemented by a power/performance tradeoff hardware logic unit provided in the hardware of the processor.

12. The method of claim 1, wherein the method is implemented by a plurality of power/performance tradeoff hardware logic units provided at places in the hardware of the processor where more than one path through an architecture of the processor is possible.

13. An apparatus, comprising:
a processor having a plurality of hardware units; and
a power/performance tradeoff unit coupled to one or more of the hardware units in the plurality of hardware units, wherein:
the processor receives an instruction, the instruction including power/performance tradeoff information associated with the instruction, wherein the power/performance tradeoff information comprises one or more bits for specifying one or more types of power/performance tradeoff criteria, and wherein the one or more bits are set and associated with the instruction by a compiler prior to execution of the instruction based upon one or more of statically analyzing code in which the instruction is present and obtaining measurements of performance of the processor during execution of a previously compiled version of the code in a runtime environment;

the power/performance tradeoff unit determines power/performance tradeoff priorities or criteria, specifying whether power conservation or performance is prioritized with regard to execution of the instruction, based on the power/performance tradeoff information; and a subset of the plurality of hardware units of the processor processes the instruction in accordance with the power/performance tradeoff priorities or criteria identified based on the power/performance tradeoff information of the instruction, wherein the power/performance tradeoff unit;

retrieves processor architecture characteristic information which describes performance/power capabilities of hardware units in the processor architecture; and selects one or more hardware units in the processor architecture to process the instruction based on a comparison of the power/performance tradeoff priorities or criteria with the performance/power capabilities of the hardware units in the processor architecture, the one or more selected hardware units comprising the subset of hardware units.

14. The apparatus of claim 13, wherein the power/performance tradeoff information comprises bits for specifying one or more of a criticality of the instruction identifying whether the instruction is part of a critical path in code being executed, a frequency of use of the instruction, read/write characteristics of the instruction specifying whether the data is going to be read only, written only, or modified, or an energy priority value.

15. The apparatus of claim 13, wherein the power/performance tradeoff unit selects a path through an architecture of the processor based on the power/performance tradeoff information, the path comprising the subset of the plurality of hardware units.

16. The apparatus of claim 15, wherein the power/performance tradeoff unit issues control signals to units within the processor to cause the instructions to be processed using the selected path, and wherein the control signals cause one or more hardware units not in the subset of hardware units to go to a low power state.

* * * * *